US008570942B2

(12) United States Patent
Iwata

(10) Patent No.: US 8,570,942 B2
(45) Date of Patent: Oct. 29, 2013

(54) WIRELESS LAN TERMINAL AND METHOD OF SEARCHING FOR ACCESS POINT

(75) Inventor: Shinichiro Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 400 days.

(21) Appl. No.: 12/670,336

(22) PCT Filed: Jul. 15, 2008

(86) PCT No.: PCT/JP2008/001894
§ 371 (c)(1),
(2), (4) Date: Jan. 22, 2010

(87) PCT Pub. No.: WO2009/016800
PCT Pub. Date: Feb. 5, 2009

(65) Prior Publication Data
US 2010/0195595 A1 Aug. 5, 2010

(30) Foreign Application Priority Data

Jul. 31, 2007 (JP) ................................ 2007-198878

(51) Int. Cl.
*H04W 4/00* (2009.01)
(52) U.S. Cl.
USPC ........................................................ 370/328
(58) Field of Classification Search
USPC ................................................ 370/310–350
See application file for complete search history.

(56) References Cited

U.S. PATENT DOCUMENTS 5,794,146 A * 8/1998 Sevcik et al. ................. 455/434
8,165,101 B2 * 4/2012 Abhishek et al. ............. 370/338

| 2003/0158922 | A1 * | 8/2003 | Park ............................... 709/222 |
| 2004/0137905 | A1 | 7/2004 | Jeong et al. |
| 2004/0198319 | A1 * | 10/2004 | Whelan et al. ................ 455/411 |
| 2005/0009565 | A1 | 1/2005 | Kwak |
| 2006/0073857 | A1 * | 4/2006 | Hanabusa et al. ............. 455/572 |
| 2006/0098614 | A1 * | 5/2006 | Moon et al. ................... 370/338 |
| 2006/0135068 | A1 * | 6/2006 | Jaakkola et al. ............. 455/41.2 |

(Continued)

FOREIGN PATENT DOCUMENTS

CN 1788510 A 6/2006
CN 1823501 A 8/2006

(Continued)

OTHER PUBLICATIONS

International Search Report for PCT/JP2008/001894 mailed Sep. 2, 2008.

(Continued)

*Primary Examiner* — Kwang B Yao
*Assistant Examiner* — Juvena Loo

(57) ABSTRACT

A method of searching for an access point using a wireless LAN terminal including a profile storage unit 305 that stores profile information including information of the channel of a predetermined access point, a scanning interval setting unit 311 that sets a scanning period, a passive scanning unit 315 that performs a passive scanning operation and detects a beacon signal, and an active scanning unit 317, wherein before said active scanning unit performs said active scanning operation at said set channel, the passive scanning unit 315 performs the passive scanning operation at the set channel for each scanning period and detects the beacon signal transmitted from the access point, and the active scanning unit 317 performs the active scanning operation at the set channel and searches for the access point after the beacon signal is detected.

10 Claims, 7 Drawing Sheets

(56) References Cited

U.S. PATENT DOCUMENTS

| | | |
|---|---|---|
| 2006/0159041 A1 | 7/2006 | Zhun |
| 2006/0215621 A1* | 9/2006 | Abdel-Kader et al. ........ 370/338 |
| 2007/0115901 A1 | 5/2007 | Lin |
| 2007/0223432 A1* | 9/2007 | Badarinath .................... 370/338 |
| 2007/0250713 A1* | 10/2007 | Rahman et al. ............... 713/171 |
| 2007/0275701 A1* | 11/2007 | Jonker ........................ 455/414.1 |
| 2008/0175166 A1* | 7/2008 | Oerton .......................... 370/254 |

FOREIGN PATENT DOCUMENTS

| | | |
|---|---|---|
| CN | 1972224 A | 5/2007 |
| JP | 11-146436 A | 5/1999 |
| JP | 2004-153394 A | 5/2004 |
| JP | 2004-229278 A | 8/2004 |
| JP | 2005-12539 A | 1/2005 |
| JP | 2006-13594 A | 1/2006 |
| JP | 2006-246433 A | 9/2006 |
| JP | 2006-311077 A | 11/2006 |

OTHER PUBLICATIONS

Chinese Office Action for CN200880101501.1 dated Aug. 3, 2012.
"IEEE Standard for Information technology—Telecommunications and information exchange between systems—Local and metropolitan area networks—Specific requirements, Part 11: Wireless LAN Medium Access Control (MAC) and Physical Layer (PHY) Specifications", IEEE Conmputer Society, XP-002593996, IEEE Std. 802.11, Jun. 12, 2007, pp. 283 and 317. Extended EP Search Report.
The Extended European Search Report for EP Application No. 08776853.7 dated on Jul. 25, 2013.

* cited by examiner

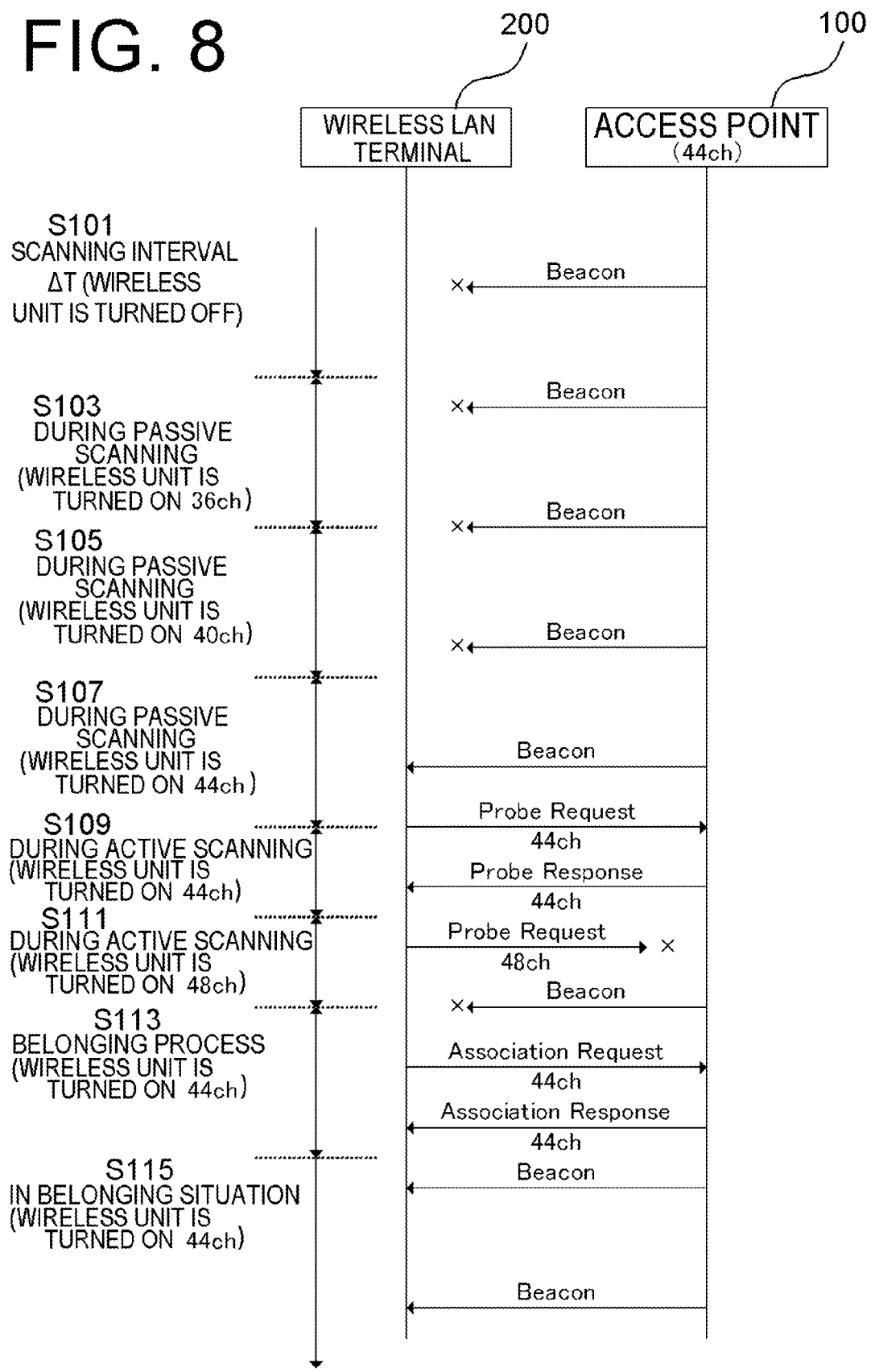

WIRELESS LAN TERMINAL AND METHOD OF SEARCHING FOR ACCESS POINT

This application is the National Phase of PCT/JP2008/001894 filed on Jul. 15, 2008 which is based upon and claims the benefit of priority from Japanese Patent Application No. 2007-198878, filed on Jul. 31, 2007, and the disclosure of which is incorporated herein in its entirety by reference.

TECHNICAL FIELD

The present invention relates to a wireless LAN terminal and a method of searching an access point, and more particularly, to a wireless LAN terminal and a method of searching for an access point using a wireless communication system based on an Institute of Electrical and Electronics Engineers (IEEE) 802.11 Standard.

BACKGROUND ART

For example, in a wireless terminal apparatus and a method of searching base stations disclosed in Patent Document 1, either an active scanning method or a passive scanning method is selected according to conditions and the relationship between predetermined scanning factors and a belonging state, and the selected scanning method is performed. In addition, it is possible to set either one of scanning factors to be enabled.
[Patent Document 1] Japanese Laid-open patent publication No. 2005-12539

DISCLOSURE OF THE INVENTION

In recent years, a wireless Local Area Network (LAN) system, which is a representative example of the IEEE 802.11 Standard, has come into widespread use. In an IEEE 802.11a Standard, a 5 GHz band (5.15 GHz to 5.35 GHz) is used. This band is also used by weather radar in Japan. Therefore, the outdoor use of a wireless LAN is not allowed. For this reason, it is difficult to unconditionally use the active scanning method. Therefore, the user of the wireless LAN terminal needs to change the scanning method from the active scanning operation which is used outdoors to the passive scanning method. That is, the user of the wireless LAN terminal needs to change the scanning method according to whether the user stays in or out, which results in low operability.

In general, from the viewpoint of security, Service Set IDentifier (SSID) information is not included in the beacon signal that is periodically transmitted from the access point. In this case, it is necessary to use the active scanning method in order to perform wireless communication indoors.

The technique of the above-mentioned Patent Document needs to be improved for the following reasons. That is, the scanning method is changed to the passive scanning method when the wireless LAN terminal is out of the service area of the access point and when communication is not performed. However, in the passive scanning method, the beacon signal is normally detected for a predetermined scanning period. As a result of this operation, when the wireless LAN terminal is out of the service area of the access point for the reason, for example, that a signal state is unstable, it takes a long time to search for the access point although the wireless LAN terminal wants to return to a belonging state as soon as possible. When the wireless LAN terminal performs scanning for a short period of time while it is certainly out of the service area of the access point since the position of the wireless LAN terminal is far removed from the access point, the search operation is useless, which results in unnecessary power consumption.

The invention has been made in order to solve the above-mentioned, and an object of the invention is to provide a wireless LAN terminal and a method of searching for an access point capable of using a terminal regardless of whether the terminal is indoors or outdoors, effectively searching an access point, and reducing power consumption.

According to the present invention, there is provided a wireless LAN terminal including: a storage unit that stores profile information including information on the channel of a predetermined access point; a unit that sets a channel to be scanned on the basis of a scanning period and the profile information; a passive scanning unit that performs a passive scanning operation at the set channel and detects a beacon signal transmitted from the access point; and an active scanning unit that performs an active scanning operation at the set channel. Before the active scanning unit performs the active scanning operation at the set channel, the passive scanning unit performs the passive scanning operation at the set channel for each scanning period and detects the beacon signal transmitted from the access point, and the active scanning unit performs the active scanning operation at the set channel and searches for the access point after the beacon signal is detected.

According to the present invention, there is provided an access point search method of searching for an access point using a wireless LAN terminal including a storage unit that stores profile information including information on the channel of a predetermined access point, a setting unit that sets a channel to be scanned on the basis of a scanning period and the profile information, a passive scanning unit that performs a passive scanning operation at the set channel and detects a beacon signal transmitted from the access point, and an active scanning unit that performs an active scanning operation at the set channel. The method includes: causing the passive scanning unit to perform the passive scanning operation at the set channel for each scanning period and to detect the beacon signal transmitted from the access point before the active scanning unit performs the active scanning operation at the set channel; and causing the active scanning unit to perform the active scanning operation at the set channel and to search for the access point after the beacon signal is detected.

Moreover, any combinations of the above components and any variation of the present invention in expression among a method, an apparatus, a system, a recording medium, and a computer program are also valid as an aspect of the present invention.

According to the invention, it is possible to provide a wireless LAN terminal and a method of searching for an access point capable of using a terminal regardless of whether the terminal is indoors or outdoors and effectively searching for an access point.

BRIEF DESCRIPTION OF THE DRAWINGS

The above and other objects, advantages and features of the present invention will be more apparent from the following description of certain preferred exemplary embodiments taken in conjunction with the accompanying drawings.

FIG. 8 is a diagram illustrating an exemplary example of the sequence of the search operation between the wireless LAN terminal and the access point in the wireless LAN system according to this exemplary embodiment.

BEST MODE FOR CARRYING OUT THE INVENTION

Figure 1:
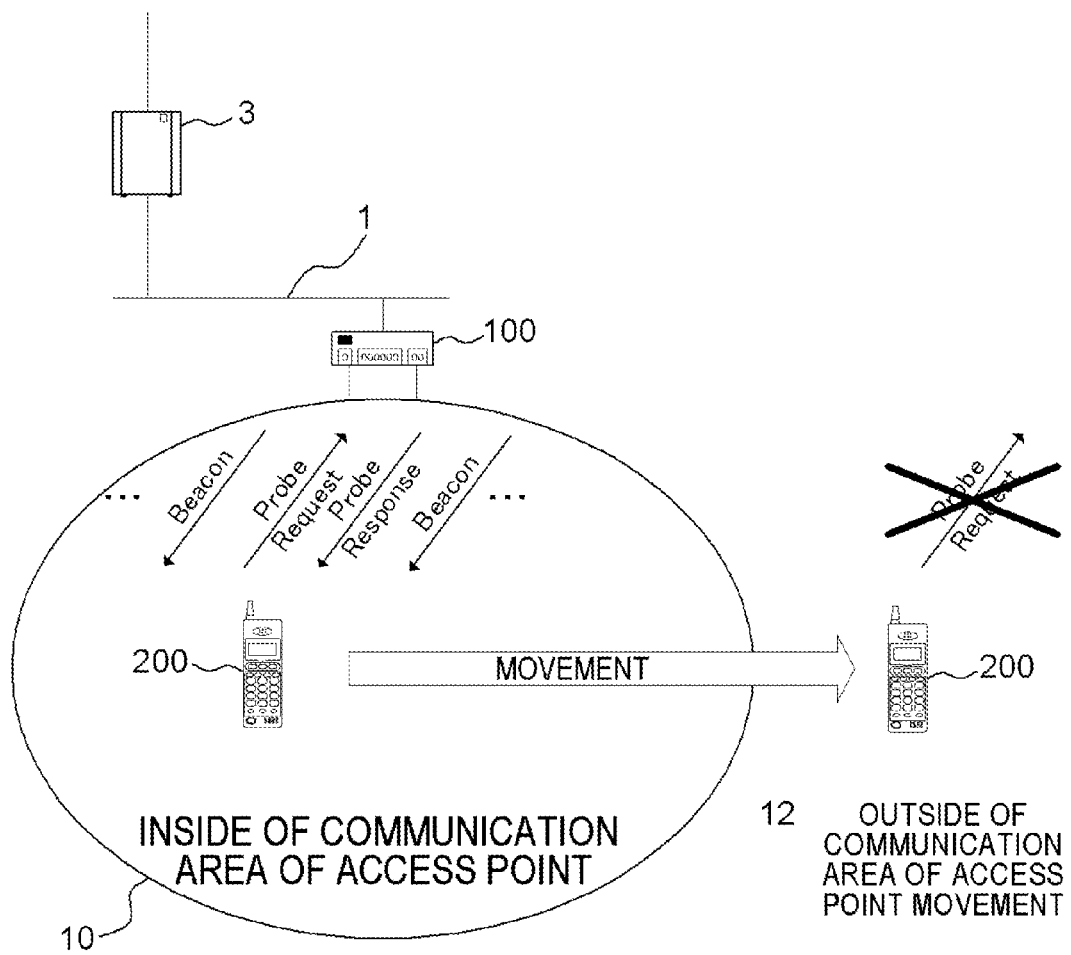
FIG. 1 is a block diagram illustrating the configuration of a wireless LAN system according to an exemplary embodiment of the invention.

Hereinafter, exemplary embodiments of the invention will be described with reference to the accompanying drawings. Throughout the entire drawings, the same components are denoted by the same reference numerals and the detailed descriptions thereof will not be repeated.

FIG. 1 is a block diagram illustrating the configuration of a wireless LAN system according to an exemplary embodiment of the invention. The wireless LAN system according to this exemplary embodiment includes a wireless LAN terminal 200, an access point 100 that wirelessly communicates with the wireless LAN terminal 200, and a gateway 3 that is connected to the access point 100 through a wired LAN 1.

In this exemplary embodiment, an IEEE 802.11 Standard is used as a wireless communication system between the access point 100 and the wireless LAN terminal 200. In this exemplary embodiment, an IEEE 802.3 Standard is used as a communication system of the wired LAN 1 between the access point 100 and the gateway 3. For example, the communication system of the wired LAN 1 may be a Fiber-Distributed Data Interface (FDDI), a Copper Distributed Data Interface (CDDI), or a Token Ring (IEEE 802.5).

The wireless LAN terminal 200 is, for example, a portable IP telephone, a portable Personal Computer (PC), or a Personal Digital Assistant (PDA). The wireless LAN terminal 200 may access the access point 100 to be connected to the LAN 1 and may be connected to the Internet (not shown) through the gateway 3. The wireless LAN terminal 200 may perform network communication with another apparatus (not shown) through the LAN 1 or the Internet and perform an IP telephone call, facsimile communication, mail transmission and reception, instant message exchange, data downloading and uploading, and so on.

When the wireless LAN terminal 200 is disposed in the inside 10 of a communication area of the access point 100, the wireless LAN terminal 200 searches (scans) for the access point 100, performs a belonging process on the detected access point 100 to belong to the access point 100 (belonging state). When the wireless LAN terminal 200 is moved to the outside 12 of a communication area of the access point 100, the wireless LAN terminal 200 is then in the state of the outside service area of the access point 100 (non-belonging state).

Two scanning methods, that is, a passive scanning method and an active scanning method are used to scan for the access point 100. The former continuously performs a receiving operation for a predetermined amount of time and checks whether there is a desired access point 100 on the basis of the received beacon signal. The latter transmits a probe request signal and checks whether there is a desired access point 100 on the basis of a probe response signal from the access point 100. In the former case, an SSID, such as the identifier of the access point 100, needs to be included in the beacon signal. In the latter case, the SSID is included in the probe request signal, and the access point 100 receiving the SSID transmits a response only when its SSID is identical to the received SSID. Therefore, the SSID does not need to be included in the probe response signal from the access point 100. The former and the latter are different from each other in this point.

Figure 4:
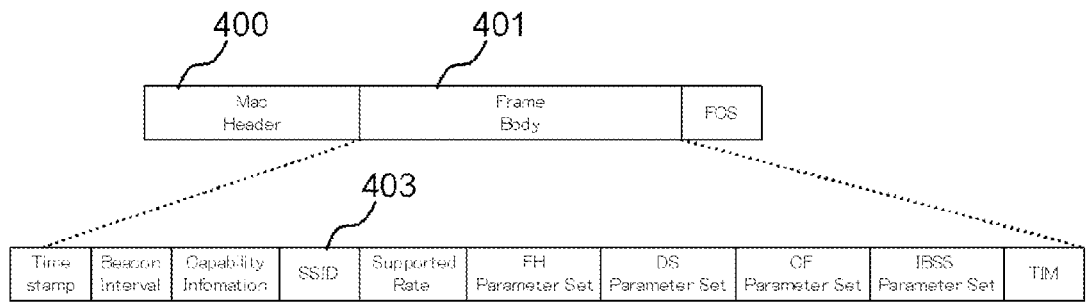
FIG. 4 is a diagram illustrating the structure of a beacon signal periodically transmitted from the access point according to this exemplary embodiment.

FIG. 4 is a diagram illustrating the structure of the beacon signal that is periodically transmitted from the access point 100 according to this exemplary embodiment. The beacon signal includes various information items for allowing the wireless LAN terminal 200 to belong to the access point 100 and various information items for synchronization after belonging to the access point. The beacon signal includes, for example, a Mac header 400 and a frame body 401. The frame body 401 includes an SSID 403. The SSID is an identification information of the access point 100 and is used when the wireless LAN terminal 200 belongs to the access point 100. However, in general operation, the beacon signal does not include the SSID 403 from the viewpoint of security.

In the wireless LAN system according to this exemplary embodiment, the wireless LAN terminal 200 performs a scanning operation to periodically search the access point 100 in the state without belonging to the access point 100 (outside service area state). In this case, first, the wireless LAN terminal performs a passive scanning operation at each channel to check whether there is a beacon signal periodically transmitted from the access point 100 and then performs an active scanning operation.

When it is checked whether there is a beacon signal by the passive scanning operation, it is possible to determine only whether there is a beacon signal without sensing information items, such as the Service Set IDentifier (SSID) included in the beacon signal. In addition, when it has confirmed that there is a beacon signal by the passive scanning method, the passive scanning operation is not performed at the other channels and only the active scanning operation is then performed at these channels.

In FIG. 1, in the inside 10 of the communication area of the access point 100, the wireless LAN terminal 200 in the outside service area state performs the passive scanning operation so as to perform periodical scanning and receives the beacon signal from the access point 100. The wireless LAN terminal 200 that is disposed in the inside 10 of the communication area of the access point confirms the beacon signal, performs the active scanning operation, and attempts to belong to the access point 100.

When the wireless LAN terminal 200 is disposed in the outside 12 of the communication area of the access point, such as outdoor, the wireless LAN terminal 200 in the outside service area state performs the passive scanning operation so as to perform periodical scanning, but cannot receive the beacon signal from the access point 100. Therefore, it is difficult for the wireless LAN terminal 200 to check whether there is a beacon signal, and the active scanning operation is not performed.

Figure 2:
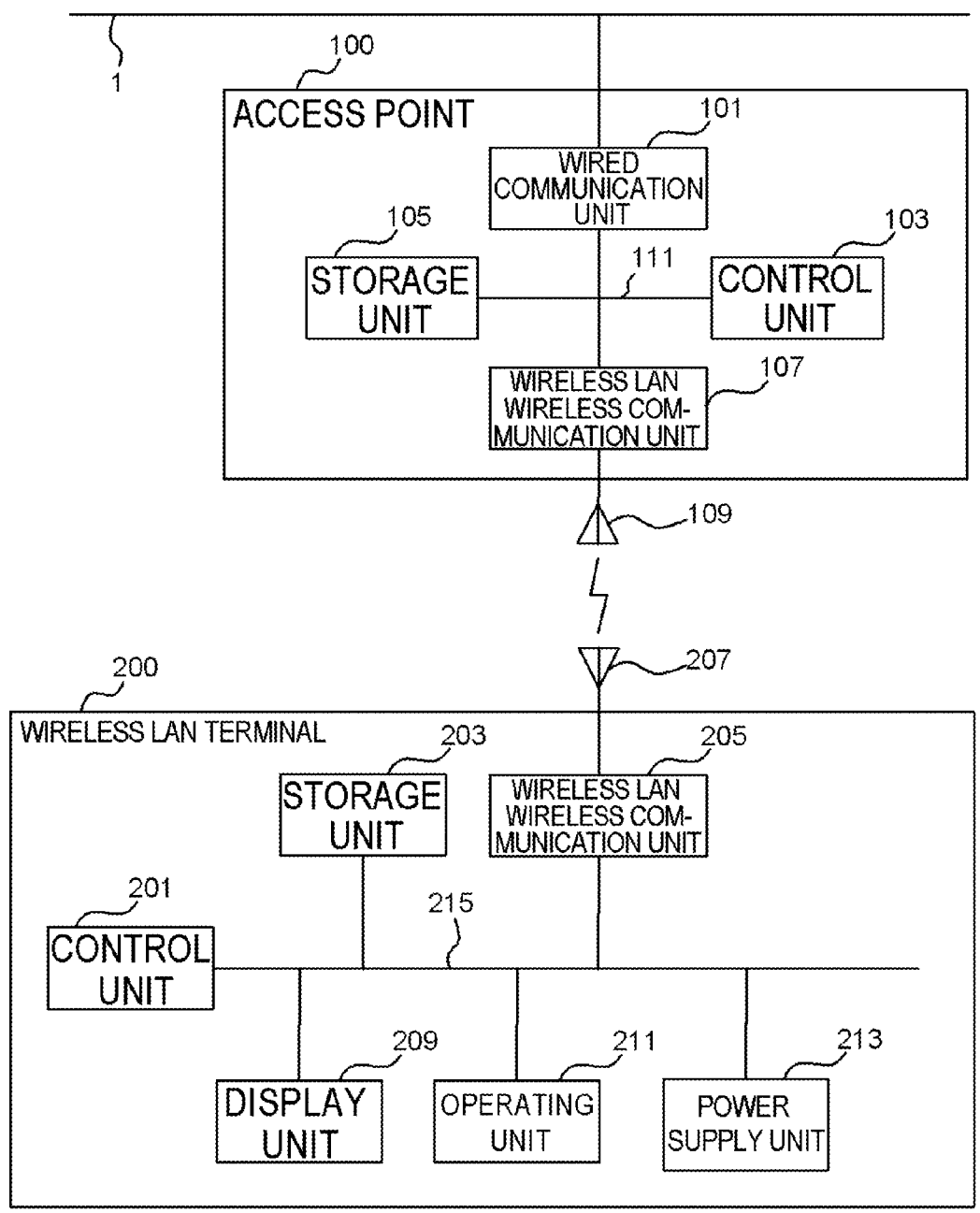
FIG. 2 is a block diagram illustrating the configuration of an access point and a wireless LAN terminal according to this exemplary embodiment.

FIG. 2 is a block diagram illustrating the configurations of the access point 100 and the wireless LAN terminal 200 according to this exemplary embodiment. In FIG. 2, the configurations of components that are not related to the essence of the invention are not shown. For example, a speaker, a microphone, and a voice processing unit of the wireless LAN terminal 200 are not shown.

The access point 100 includes a wired communication unit 101, a control unit 103, a storage unit 105, a wireless LAN wireless communication unit 107, and an antenna 109. The wired communication unit 101 provides an interface for connection to the LAN 1. The control unit 103 is connected to the wired communication unit 101, the storage unit 105, and the wireless LAN wireless communication unit 107 through a bus 111, and controls all the components of the access point 100 and the overall operation of the access point 100. The storage unit 105 includes a storage area that stores various set values of the access point 100 and a buffer that stores communication data. The wireless LAN wireless communication unit 107 provides a communication interface for connection to the wireless LAN terminal 200 through the antenna 109.

The wireless LAN terminal 200 includes a control unit 201, a storage unit 203, a wireless LAN wireless communication unit 205, an antenna 207, a display unit 209, an operating unit 211, and a power supply unit 213. The control unit 201 is connected to the storage unit 203, the wireless LAN wireless communication unit 205, the display unit 209, the operating unit 211, and the power supply unit 213 through a bus 215, and controls all the components of the wireless LAN terminal 200 and the overall operation of the wireless LAN terminal 200. The storage unit 203 includes an area that stores programs executed by the control unit 201, a work area that is used by the control unit 201 when the control unit 201 executes the programs, a storage area that stores various set values of the wireless LAN terminal 200, and a buffer that stores communication data.

The wireless LAN wireless communication unit 205 provides a communication interface for connection to the access point 100 through the antenna 207. The display unit 209 is, for example, a Liquid Crystal Display (LCD) or an organic Electro-Luminescence (EL) display, and displays various screens. The operating unit 211 includes, for example, operating keys, a switch, a dial, a touch pen, and a touch panel, and is operated by the user to accept the user's operations. The display unit 209 and the operating unit 211 form a user interface. The power supply unit 213 controls the power which is supplied to the wireless LAN terminal 200.

Figure 3:
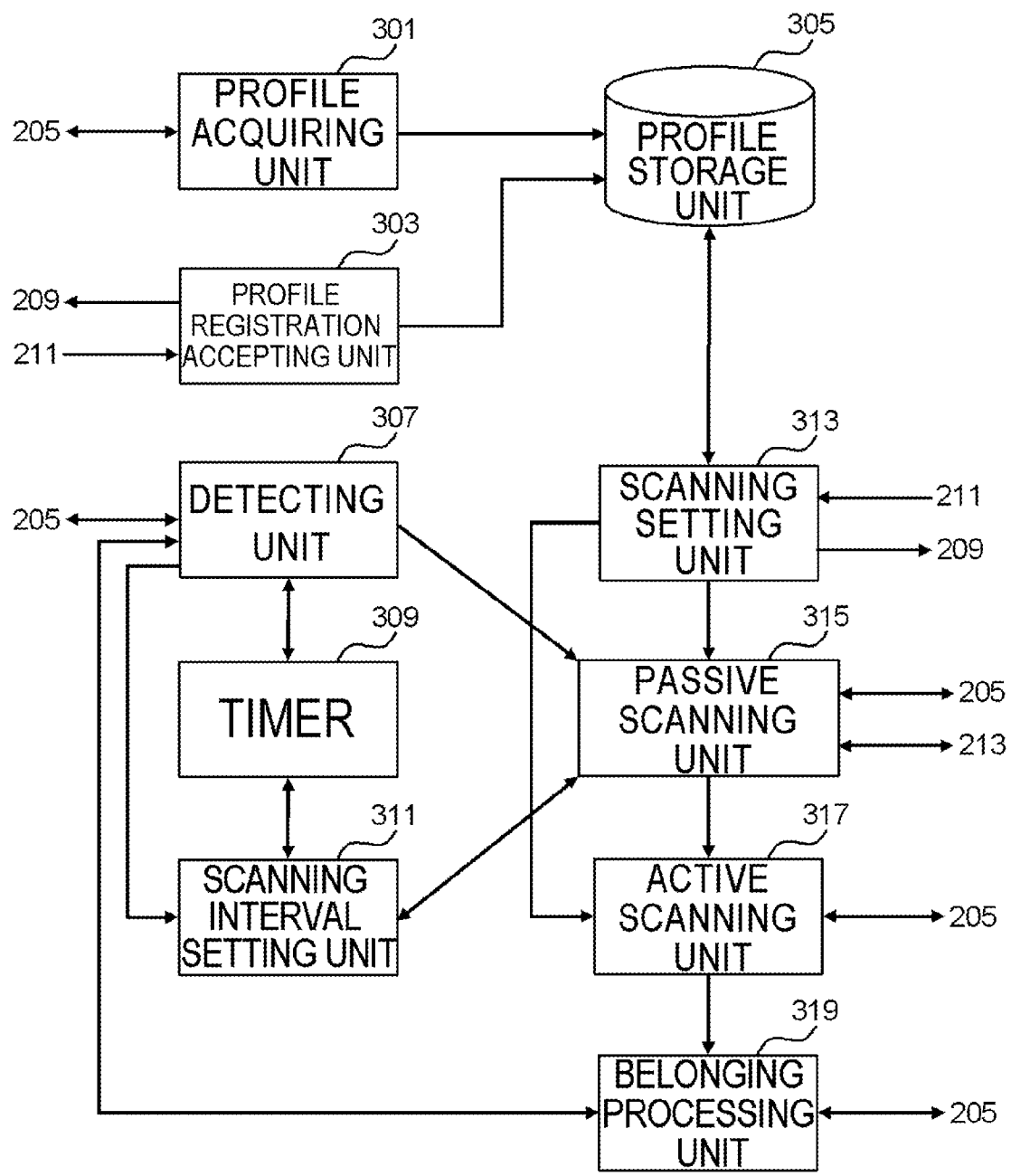
FIG. 3 is a functional block diagram schematically illustrating the wireless LAN terminal according to this exemplary embodiment.

FIG. 3 is a functional block diagram schematically illustrating the wireless LAN terminal 200 according to this exemplary embodiment. Each constitutional element of the wireless LAN terminal 200 is realized by any combination of hardware and software based on a CPU of any computer, a memory, a program that is loaded on the memory to implement the components shown in the drawings, a memory unit such as a hard disk that stores the program, and an interface for network connection. It will be understood by those skilled in the art that a diversity of variations of a method and device of realizing the components may be made. Each of drawings to be described hereinafter does not depict hardware-based constructions but function-based blocks.

The wireless LAN terminal 200 according to this exemplary embodiment includes a profile storage unit 305 that stores the profile information of a predetermined access point 100 (FIG. 2), a unit (a scanning interval setting unit 311 and a scanning setting unit 313) that sets a channel to be scanned on the basis of a scanning period and the profile information, a passive scanning unit 315 that performs the passive scanning operation at the set channel and detects the beacon signal transmitted from the access point, and an active scanning unit 317 that performs the active scanning operation at the set channel. Before the active scanning unit 317 performs the active scanning operation at the set channel, the passive scanning unit 315 performs the passive scanning operation at the set channel for each scanning period and detects the beacon signal transmitted from the access point 100 (FIG. 2). Then, the active scanning unit 317 performs the active scanning operation at the set channel and searches for the access point.

In the wireless LAN terminal 200 according to this exemplary embodiment, after the beacon signal is detected, the passive scanning operation by the passive scanning unit 315 is interrupted, and only the active scanning operation by the active scanning unit 317 is performed.

Specifically, the wireless LAN terminal 200 includes a profile acquiring unit 301, a profile registration accepting unit 303, a profile storage unit 305, a detecting unit 307, a timer 309, a scanning interval setting unit 311, a scanning setting unit 313, a passive scanning unit 315, an active scanning unit 317, and a belonging processing unit 319.

In the wireless LAN terminal 200 according to this exemplary embodiment, as described above, the control unit 201 performs various processing operations according to the computer programs stored in the storage unit 203 to implement the functions of the above units 301 to 319.

Figure 5:
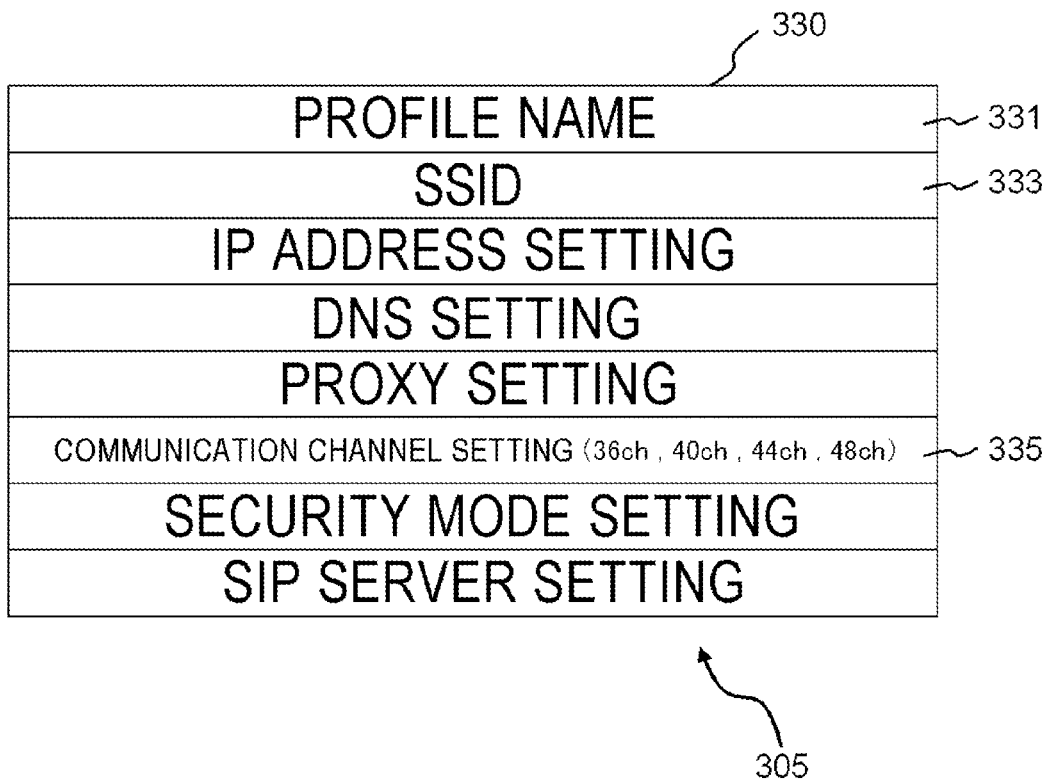
FIG. 5 is a diagram illustrating an exemplary example of the structure of a profile storage unit shown in FIG. 3.

FIG. 5 is a diagram illustrating an exemplary example of the structure of the profile storage unit 305. The profile storage unit 305 includes a profile list 330 of the access point 100, which is an access candidate, as shown in FIG. 5. A plurality of profile lists 330 may be stored in the profile storage unit 305. The profile list 330 includes a profile name 331 for identifying the list and an SSID 333 of the access point 100. In addition, the profile list 330 includes a communication channel setting field 335 and various network setting information required for the wireless LAN terminal, which will not be described since they are not related to the essence of the invention.

Returning to FIG. 3, the profile acquiring unit 301 searches the surroundings through the wireless LAN wireless communication unit 205 shown in FIG. 2, acquires information from the access point 100, which is an access candidate, and automatically adds the profile list to the profile storage unit 305. For example, the access point 100 shown in FIG. 2 may store the profile information in the storage unit 105 and periodically transmit the profile information through the wireless LAN wireless communication unit 107 shown in FIG. 2. For example, Wi-Fi Protected Setup (trademark) of WI-FI ALLIANCE (registered trademark) is used as a method of automatically acquiring and setting up the profile list.

Alternatively, the access point 100 may include an operating unit that accepts an instruction to transmit profile information. When the operating unit is operated by the user, the operating unit may accept the transmission instruction, and then the access point 100 may transmit the profile information. The wireless LAN terminal 200 then may receive the profile information and automatically sets the profile information. For example, AirStation One-Touch Secure System (AOSS) (registered trademark) of Buffalo Inc. may be used for this automatic setting operation.

The profile registration accepting unit 303 displays a profile list setting screen (not shown) on the display unit 209 so as to make the user perform a setting operation. When the operating unit 211 accepts the user's setting operations, the profile registration accepting unit 303 then may store the profile list in the profile storage unit 305.

In the situation that the wireless LAN wireless communication unit 205 are receiving the beacon signals after a notice indicating that the wireless LAN terminal 200 belongs to the access point 100 is received from the belonging processing unit 319, which will be described below, the detecting unit 307 detects that the wireless LAN terminal becomes the state of the outside service area of the access point 100 in case when the wireless LAN wireless communication unit 205 becomes impossible to receive the beacon signal for a predetermined time or more. When the wireless LAN terminal becomes the state of the outside service area, the detecting unit 307 notifies this to the scanning interval setting unit 311, the passive scanning unit 315, and the belonging processing unit 319.

The timer 309 is a measuring unit that measures the time when the detecting unit 307 monitors the reception of the beacon signal or the scanning interval set by the scanning interval setting unit 311. The scanning interval setting unit 311 sets a scanning interval at which the passive scanning unit 315 performs the passive scanning operation.

Figure 7:
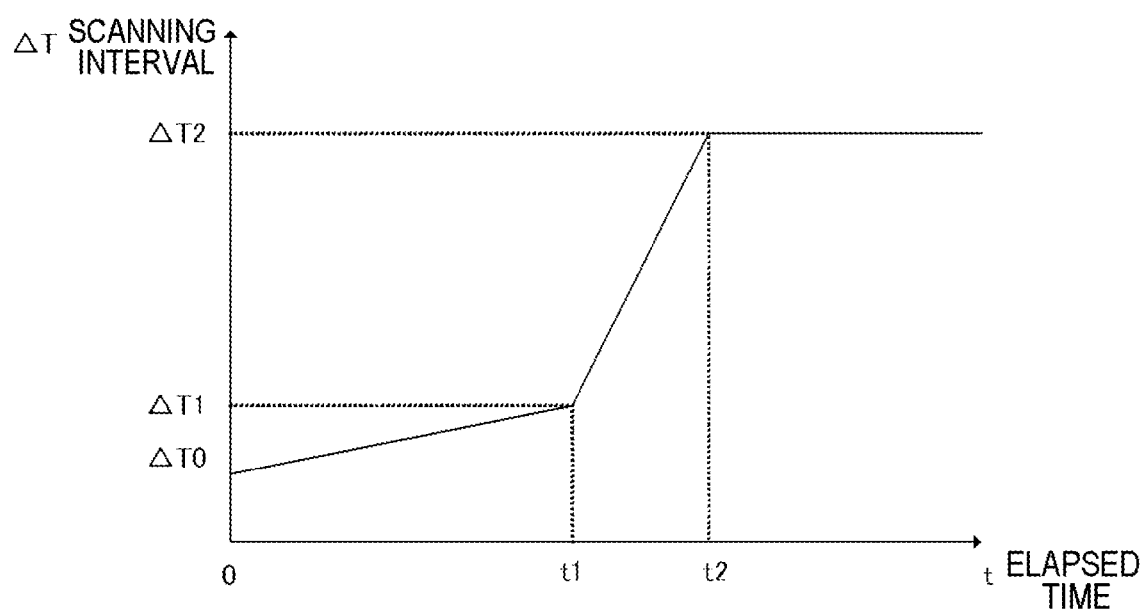
FIG. 7 is a diagram illustrating the setting of the scanning period of the wireless LAN terminal according to this exemplary embodiment.

FIG. 7 is a diagram illustrating the setting of the scanning period of the wireless LAN terminal 200 according to this exemplary embodiment, which will be described with reference to FIGS. 3 and 7.

The wireless LAN terminal 200 according to this exemplary embodiment further includes the belonging processing unit 319 that makes the wireless LAN terminal 200 belong to the access point 100 when the active scanning unit 317 detects the access point 100 and the detecting unit 307 which are receiving the transmitted beacon signals periodically transmitted from the access point 100 while the wireless LAN terminal belongs to the access point, and detects that the wireless LAN terminal becomes an outside service area state when the wireless LAN terminal 200 becomes impossible to receive the beacon signal for a predetermined time or more and. The setting unit (the scanning interval setting unit 311) sets the scanning period to an initial scanning interval T0 immediately after the detecting unit 307 detects that the wireless LAN terminal is in the outside service area state, and makes the scanning interval $\Delta T$ increase at a first increasing rate $((\Delta T1-\Delta T0)/t1)$ according to an elapsed time t. In addition, after a predetermined time t1 has elapsed, the setting unit makes the scanning interval $\Delta T$ increase at a second increasing rate $((\Delta T2-\Delta T1)/(t2-t1))$ which is more than the first increasing rate according to the elapsed time t. In this way, the setting unit sets the scanning period.

That is, when the wireless LAN terminal 200 does not belong to the access point 100 (outside service area state), the wireless LAN terminal 200 periodically performs an operation of searching (scanning) for the access point 100 for the scanning period of the scanning interval $\Delta T$. The power supply unit 213 of the wireless LAN terminal 200 supplies power to the wireless LAN wireless communication unit 205 during scanning. When the wireless LAN terminal is in the outside service area state, the power supply unit 213 cuts the supply of power to the wireless LAN wireless communication unit 205 until the next scanning operation.

As shown in FIG. 7, in the wireless LAN terminal 200 according to this exemplary embodiment, when an initial scanning interval is $\Delta T0$ and the elapsed time from the outside service area state is t, the scanning interval setting unit 311 sets the scanning interval $\Delta T$ such that it gradually increases with the elapsed time t. When the elapsed time t becomes t1 ($\Delta T=\Delta T1$), the increasing rate of $\Delta T$ corresponding to the elapsed time t is increased. That is, the scanning interval setting unit 311 makes the scanning interval $\Delta T$ increase at the first increasing rate $((\Delta T1-\Delta T0)/t1)$ during the period from the time when the wireless LAN terminal becomes the outside service area state to the elapsed time t1, and makes the scanning interval $\Delta T$ increase at the second increasing rate $((\Delta T2-\Delta T1)/(t2-t1))$ which is more than the first increasing rate when the elapsed time becomes t1.

The scanning interval setting unit 311 fixes the scanning interval $\Delta T$ when the elapsed time t becomes t2 ($\Delta T=\Delta T2$). In this way, the passive scanning unit 315 repeatedly performs scanning at a constant time interval $\Delta T2$.

The scanning interval $\Delta T$ thus changed is intended to make the scanning interval $\Delta T$ set to be short so that the belonging state can be rapidly recovered, immediately after the wireless LAN terminal becomes in the outside service area state, and to make the scanning interval $\Delta T$ set to be long in order to reduce power consumption when the wireless LAN terminal cannot become the belonging state for some time.

As such, as the elapsed time t becomes longer, the scanning interval $\Delta T$ can be set to be longer. Therefore, at the beginning of the outside service area state, the scanning is performed at a short scanning interval so that it is possible to recover as quickly as possible. In a case when a predetermined time has elapsed after the wireless LAN terminal becomes the outside service area state, it is possible to continuously perform the scanning with high efficiency while reducing power consumption.

Returning to FIG. 3, the scan setting unit 313 checks the profile list 330 (FIG. 5) with reference to the profile storage unit 305, and sets the number of channels to be scanned and each channel. When there is a plurality of profile lists in the profile storage unit 305, the scan setting unit 313 displays the profile lists on the display unit 209 such that the user may view the profile lists. Then, the user operates the operating unit 211 to select one of the profile lists to be used for wireless communication. The instruction of the selected list may be then accepted by the operating unit 211.

The passive scanning unit 315 performs the passive scanning operation at the scanning interval $\Delta T$ set by the scanning interval setting unit 311, and detects the beacon signal transmitted from the access point 100. The detection of the beacon signal may be performed by the passive scanning unit 315 by determining only whether there is a beacon signal or not without detecting information items such as an SSID. The passive scanning unit 315 performs the passive scanning operation at the channel set by the scan setting unit 313. When a plurality of channels are set, the passive scanning unit 315 repeatedly performs the passive scanning operation while sequentially changing the channels until the beacon signal is detected.

The active scanning unit 317 performs the active scanning operation at the channel set by the scan setting unit 313 in response to the detection of the beacon signal by the passive scanning unit 315. When a plurality of channels are set, the active scanning unit 317 scans all the channels while sequentially changing the channel. When a plurality of access points 100 are detected, the active scanning unit 317 selects a target access point 100 according to predetermined rules. For example, the active scanning unit 317 may select an access point with a high-intensity signal or a high Signal to Noise Ratio (SNR).

The belonging processing unit 319 performs belonging processing on the access point 100 selected by the active scanning unit 317 through the wireless LAN wireless communication unit 205. Specifically, the belonging processing unit 319 transmits an association request to the access point 100, receives an association response from the access point 100, and then moves to the belonging state. While the wireless LAN terminal belongs to the access point 100, the aforementioned detecting unit 307 receives the beacon signal from the access point 100 and is synchronized with the beacon signal. When the detecting unit 307 does not detect the beacon signal for a predetermined time or more, the wireless LAN terminal then moves the outside service area state.

Figure 6:
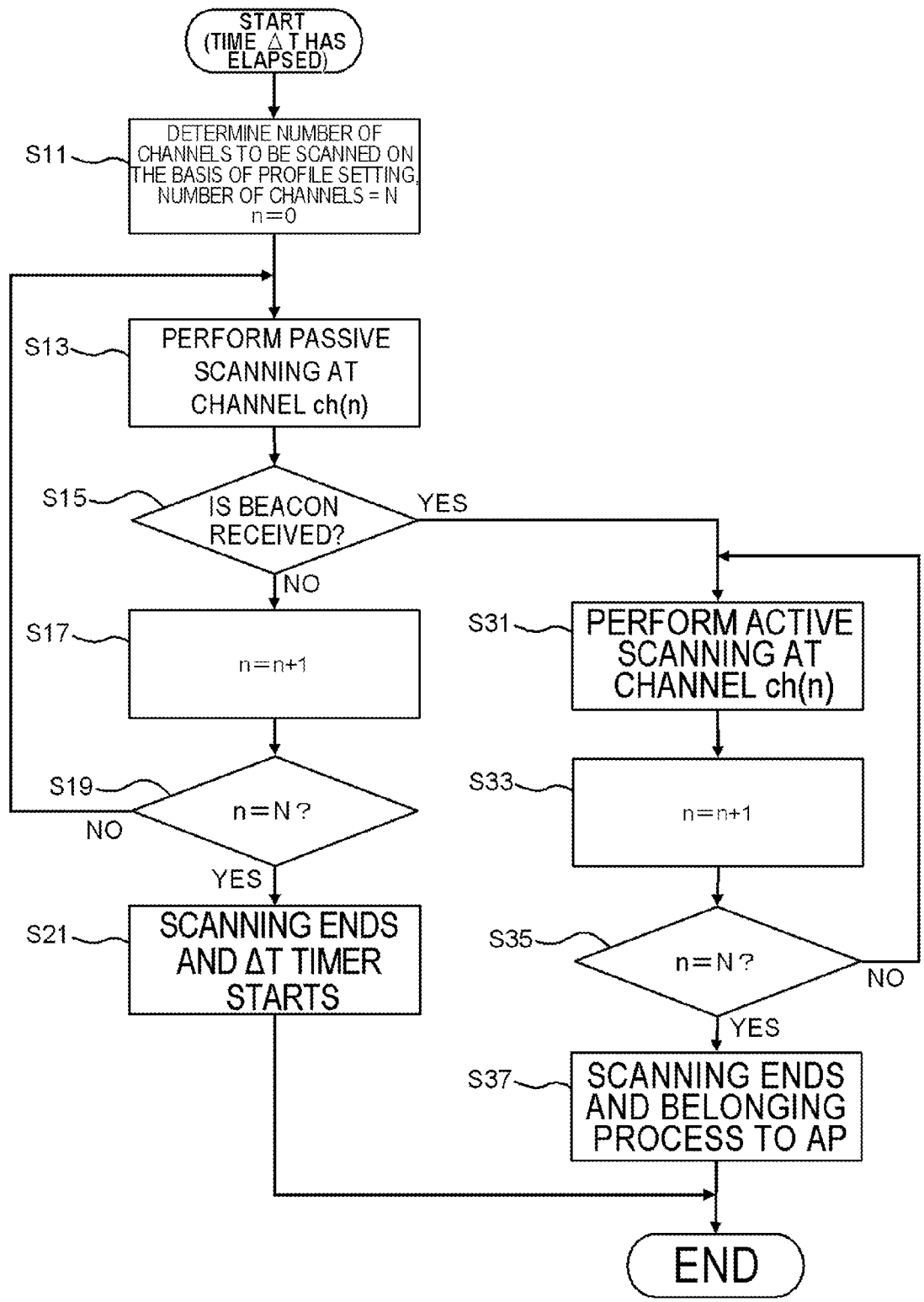
FIG. 6 is a flowchart illustrating an exemplary example of the operation of searching for the access point in the wireless LAN terminal according to this exemplary embodiment for the access point.

Next, the operation of the thus constructed wireless LAN system according to this exemplary embodiment will be described hereinafter. FIG. 6 is a flowchart illustrating an exemplary example of the search operation for the access point 100 in the wireless LAN terminal 200 according to this exemplary embodiment. It will be described herein later with reference to FIGS. 2, 3, 5, and 6.

The method of searching for the access point 100 according to this exemplary embodiment using the wireless LAN terminal 200 including the profile storage unit 305 (FIG. 3) that stores profile information including the channel information of a predetermined access point 100, a setting unit (the scanning interval setting unit 311 and the scanning setting unit 313 shown in FIG. 3) that sets a channel to be scanned on the basis of the scanning period and the profile information, the passive scanning unit 315 (FIG. 3) that performs the passive scanning operation at the set channel and detects the beacon signal, and the active scanning unit 317 that performs the active scanning operation at the set channel. In the method of searching for the access point, before the active scanning unit 317 performs the active scanning operation at the set channel (S31), the passive scanning unit 315 performs the passive scanning operation at the set channel for each scanning period (S13). After the beacon signal transmitted from the access point 100 is detected (S15: YES), the active scanning unit 317 performs the active scanning operation at the set channel (S31) and searches for the access point.

As shown in FIG. 6, first, the scanning interval setting unit 311 shown in FIG. 3 accesses the profile storage unit 305 shown in FIG. 3, reads the profile list 330 (FIG. 5), and sets the number of channels to be scanned and each channel (S11). If necessary, the profile list 330 (FIG. 5) may be displayed on the display unit 209 so as to present the profile list to the user and make the user to select one of the profile lists 330. Then, the operating unit 211 (FIG. 2) may accept the selected profile list 330. When the profile list 330 shown in FIG. 5 is used, the number N of channels is 4, and the respective channels are set as follows: ch(0)=36ch, ch(1)=40ch, ch(2)=44ch, and ch(3)=48ch. In the step S11, a counter variable n is initialized at 0.

The flow of this process is activated at the scanning time intervals ΔT. However, the process in the step S11 is performed when the wireless LAN terminal 200 searches for the access point 100. In particular, the process in the step S11 may be bypassed as long as an instruction to change the profile is not accepted from the user. In this case, the power supply unit 213 shown in FIG. 2 does not supply power to the wireless LAN wireless communication unit 205 shown in FIG. 2.

Then, the scanning interval setting unit 311 shown in FIG. 3 detects the scanning interval ΔT and notifies the passive scanning unit 315 shown in FIG. 3. The passive scanning unit 315 shown in FIG. 3 performs the passive scanning operation at the channel ch(n) (S13). In this case, the power supply unit 213 shown in FIG. 2 supplies power to the wireless LAN wireless communication unit 205 shown in FIG. 2. Then, until the belonging state is detected within the scanning period and in the belonging state, the power supply unit 213 shown in FIG. 2 supplies power to the wireless LAN wireless communication unit 205 shown in FIG. 2. When the wireless LAN terminal is not changed to the belonging state within the scanning period, the power supply unit 213 shown in FIG. 2 stops the supply of power to the wireless LAN wireless communication unit 205 shown in FIG. 2 until the next scanning period.

When the passive scanning unit 315 shown in FIG. 3 detects the beacon signal (S15: YES), the process proceeds to the step S31. When the beacon signal is not detected (S15: NO), the counter variable n is incremented (S17), and it is checked whether all the channels are completely scanned (S19). When it is determined that all the channels have not been completely scanned (S19: NO), the process returns to the step S13.

When it is determined that all the channels have been completely scanned (S19: YES), the outside service area state is maintained and the scanning operation ends since it is difficult to search the access point 100 having the profile set in the step S11 (S21). Then, the scanning interval setting unit 311 shown in FIG. 3 is instructed to start to count the scanning interval ΔT. The scanning interval setting unit 311 shown in FIG. 3 sets the scanning interval, as described above, such that scanning may be performed again after the next scanning interval ΔT. In this case, the power supply unit 213 shown in FIG. 2 stops the supply of power to the wireless LAN wireless communication unit 205 shown in FIG. 2.

When the passive scanning unit 315 shown in FIG. 3 performs the passive scanning operation to detect the beacon signal (S15: YES), the active scanning unit 317 show in FIG. 3 performs the active scanning operation at the channel(2)=44ch which is the same as the channel at which the beacon signal is detected by the passive scanning operation (S31). Then, the counter variable n is incremented (S33), and it is checked whether the active scanning operation is completely performed on the remaining channels (S35). When it is determined that the active scanning operation has not been completely performed on the remaining channels (S35: NO), the process returns to the step S31. When it is determined that the active scanning operation has been completely performed on the remaining channels (S35: YES), the scanning operation ends. The belonging processing unit 319 shown in FIG. 3 then makes the wireless LAN terminal belong to the detected access point 100 (S37).

A wireless LAN sequence when the access point 100 is searched by the above-mentioned operation will be described with reference to FIG. 8. FIG. 8 is a diagram illustrating an exemplary example of the sequence of the search operation between the wireless LAN terminal 200 and the access point 100 in the wireless LAN system according to this exemplary embodiment. It will be described hereinafter with reference to FIGS. 2, 3, and 8.

In this example, it is assumed that only the access point 100 with a channel 44ch exists in the vicinity of the wireless LAN terminal 200.

First, when it is notified that the scanning interval ΔT set by the scanning interval setting unit 311 shown in FIG. 3 has elapsed (S101), the scan setting unit 313 shown in FIG. 3 reads the profile list from the profile storage unit 305 shown in FIG. 3 and then sets the number of channels (N=4) and each channel. The counter variable n is initialized at 0. The passive scanning unit 315 shown in FIG. 3 performs the passive scanning operation at the channel ch(0)=36ch (S103). In this case, no beacon signal is detected. In addition, in this case, the power supply unit 213 shown in FIG. 2 starts to supply power to the wireless LAN wireless communication unit 205 shown in FIG. 2.

Then, scanning is sequentially performed on the channels ch(0)=36ch, ch(1)=40ch, ch(2)=44ch, and ch(3)=48ch in that order. When the passive scanning unit 315 shown in FIG. 3 performs the passive scanning operation at the channel ch(1)=40ch (S105), no beacon signal is detected. Next, when the passive scanning operation is performed at the channel ch(2)=44ch (S107), the passive scanning unit 315 shown in FIG. 3 receives the beacon signal, and the active scanning unit 317 shown in FIG. 3 performs the active scanning operation at the channel ch(2)=44ch which is the same as the channel at which the beacon signal is detected by the passive scanning operation (S109). Then, the counter variable is incremented and the active scanning unit 317 shown in FIG. 3 performs the active scanning operation at the channel ch(3)=48ch (S111). In this case, the passive scanning operation by the passive scanning unit 315 shown in FIG. 3 is not performed, but only the active scanning operation by the active scanning unit 317 shown in FIG. 3 is performed.

In this case, since only the access point 100 with channel 44 is searched, the belonging processing unit 319 shown in FIG. 3 performs the belonging processing on the access point 100 with the channel 44 through the wireless LAN wireless communication unit 205 (FIG. 2) (S113). Then, the wireless LAN terminal 200 belongs to the access point 100 with the channel 44 (S115). The detecting unit 307 shown in FIG. 3 normally receives the beacon signal from the access point 100, and is synchronized with the signal. When the detecting unit 307 shown in FIG. 3 does not receive the beacon signal from the access point 100 for a predetermined time or more, the state of the belonging to the access point 100 is released to become the outside service area (not shown).

As described above, according to the wireless LAN system of this exemplary embodiment, as in the IEEE 802.11a Standard, even when the use of a 5 GHz band is prevented outdoors, the passive scanning operation is performed to detect the beacon signal before the active scanning operation is performed. In this way, it is possible to recognize that the terminal is indoors. After it is recognized that the terminal is indoors, it is possible to perform the active scanning operation. Therefore, it is possible to use the terminal without considering whether the terminal is indoors or outdoors.

After the beacon signal is detected, only the active scanning operation is performed, and the passive scanning operation that is performed at a predetermined time interval is interrupted. Therefore, it is possible to search an access point at a high speed and thus reduce the search time.

As the elapsed time becomes longer, the interval of the scanning period may be set to become longer. Therefore, it is possible to perform scanning for a short scanning period in the initial state in which the wireless LAN terminal becomes the outside service area state, thereby recovering as quickly as possible. When a predetermined time has elapsed in the outside service area state, it is possible to continuously perform scanning with high efficiency while reducing power consumption.

Although the exemplary embodiment of the invention has been described above with reference to the drawings, it is apparent that the present invention is not limited to the above embodiment, and may be modified and changed without departing from the scope and spirit of the invention.

For example, a wireless LAN terminal according to another exemplary embodiment of the invention may further include a determining unit (not shown) that determines whether the channels in which the profile information of the profile storage unit 305 is set include a specific channel that is allowed to be used outdoors. When the determining unit determines that the channels include the specific channel, the passive scanning operation may not be performed by the passive scanning unit 315 shown in FIG. 3, but only the active scanning operation may be performed by the active scanning unit 317 shown in FIG. 3.

In the 2.4 GHz band used in the IEEE 802.11b/g Standard, the terminal is allowed to be used outdoors. Therefore, when the channels used in the IEEE 802.11b/g Standard are included in the profile list of the profile storage unit 305, the active scanning operation may be unconditionally performed at these channels. When the active scanning operation is performed without performing the passive scanning operation, the setting of the period for which the active scanning operation is performed may be performed at each scanning interval ΔT set by the scanning interval setting unit 311 as described above.

Although the exemplary embodiment of the invention has been described above, the invention is not limited thereto. It will be understood by those skilled in the art that the structure or the details of the invention may be changed in various ways without departing from the scope of the invention.

The invention claimed is:

1. A wireless LAN terminal comprising:
   a storage unit that stores profile information including information on a channel of a predetermined access point and an SSID (service set identifier);
   a unit that sets a channel to be scanned on the basis of a scanning period and said profile information;
   a passive scanning unit that performs a passive scanning operation at the set channel and checks whether there is a beacon signal transmitted from said access point without sensing the SSID of the transmitted beacon signal; and
   an active scanning unit that performs an active scanning operation at said set channel by transmitting a probe request signal including said SSID of said predetermined access point, and receiving a probe response signal from the access point which has an SSID identical to the transmitted SSID, so as to detect said access point,
   wherein, before said active scanning unit performs said active scanning operation at said set channel, said passive scanning unit performs said passive scanning operation at said set channel for each said scanning period, and said active scanning unit performs said active scanning operation at said set channel after said passive scanning unit confirms that there is said beacon signal without sensing said SSID of said beacon signal so as to search for said access point.

2. The wireless LAN terminal as set forth in claim 1, wherein, after confirming that there is said beacon signal, said passive scanning unit interrupts said passive scanning operation, and only said active scanning operation is performed by said active scanning unit.

3. The wireless LAN terminal as set forth in claim 1, further comprising:
   a unit that makes said wireless LAN terminal belong to said access point when said active scanning unit detects said access point; and
   a unit that are receiving said beacon signals periodically transmitted from said access point while said wireless LAN terminal belongs to said access point, and detects that said wireless LAN terminal becomes an outside service area state when said wireless LAN terminal becomes impossible to receive said beacon signal for a predetermined time or more,
   wherein said setting unit sets said scanning period to an initial scanning interval immediately after said detecting unit detects that said wireless LAN terminal is in the outside service area state, and makes said scanning interval increase at a first increasing rate according to an elapsed time, and makes said scanning interval increase at a second increasing rate which is more than said first increasing rate according to said elapsed time after a predetermined time has elapsed, thereby setting said scanning period.

4. The wireless LAN terminal as set forth in claim 1, further comprising:

a determining unit that determines whether said set channels in said profile information include a specific channel which is allowed to be used outdoors, wherein, when said determining unit determines that said set channels include said specific channel, said passive scanning operation is not performed by said passive scanning unit, but only said active scanning operation is performed by said active scanning unit.

5. A method of searching for an access point using a wireless LAN terminal including a storage unit that stores profile information including information on a channel of a predetermined access point and an SSID (service set identifier), a setting unit that sets a channel to be scanned on the basis of a scanning period and said profile information, a passive scanning unit that performs a passive scanning operation at said set channel and checks whether there is a beacon signal transmitted from said access point without sensing the SSID of the transmitted beacon signal, and an active scanning unit that performs an active scanning operation at said set channel by transmitting a probe request signal including said SSID of said predetermined access point and receiving a probe response signal from the access point which has an SSID identical to the transmitted SSID, so as to detect said access point, the method comprising:

causing said passive scanning unit to perform said passive scanning operation at said set channel for each said scanning period before said active scanning unit performs said active scanning operation at said set channel; and causing said active scanning unit to perform said active scanning operation at said set channel after said passive scanning unit confirms that there is said beacon signal without sensing said SSID of said beacon signal so as to search for said access point.

6. The method of searching for the access point as set forth in claim 5, wherein, after confirming that there is said beacon signal, said wireless LAN terminal interrupts said passive scanning operation of said passive scanning unit and performs only said active scanning operation of said active scanning unit.

7. The method of searching for the access point as set forth in claim 5, wherein the wireless LAN terminal further includes:

a belonging processing unit that makes said wireless LAN terminal belong to said access point when said active scanning unit detects said access point; and a detecting unit that receives said beacon signals periodically transmitted from said access point while said wireless LAN terminal belongs to said access point, and detects that said wireless LAN terminal becomes an outside service area state when said wireless LAN terminal becomes impossible to receive said beacon signal for a predetermined time or more, setting, in said setting unit, said scanning period to an initial scanning interval immediately after said detecting unit detects that said wireless LAN terminal is in the outside service area state, and making said scanning interval increase at a first increasing rate according to an elapsed time, and making said scanning interval increase at a second increasing rate which is more than said first increasing rate according to said elapsed time after a predetermined time has elapsed, thereby setting said scanning period.

8. The method of searching for the access point as set forth in claim 5, wherein said wireless LAN terminal further includes a determining unit that determines whether said set channels in said profile information include a specific channel which is allowed to be used outdoors, and when said determining unit determines that said set channels include said specific channel, said passive scanning operation is not performed by said passive scanning unit, but only said active scanning operation is performed by said active scanning unit.

9. A system of searching for the access point comprising:

storage means for storing profile information including information on a channel of a predetermined access point and an SSID (service set identifier);

means for setting a channel to be scanned on the basis of a scanning period and said profile information;

passive scanning means for performing a passive scanning operation at the set channel and checks whether there is a beacon signal transmitted from said access point without sensing the SSID of the transmitted beacon signal; and active scanning means for performing an active scanning operation at said set channel by transmitting a probe request signal including said SSID of said predetermined access point, and receiving a probe response signal from the access point which has an SSID identical to the transmitted SSID, so as to detect said access point, wherein, before said active scanning means performs said active scanning operation at said set channel, said passive scanning means performs said passive scanning operation at said set channel for each said scanning period, and said active scanning means performs said active scanning operation at said set after said passive scanning means confirms that there is said beacon signal without sensing said SSID of said beacon signal so as to search for said access point.

10. The wireless LAN terminal as set forth in claim 1, further comprising:

a communication unit that communicates with said access point; and a power supply control unit that operates to supply power to said communication unit while said passive scanning unit performs said passive scanning operation, or to cut said supply of power to said communication unit in an outside service area state.

* * * * *